United States Patent
Hammer

(10) Patent No.: US 8,985,444 B2
(45) Date of Patent: Mar. 24, 2015

(54) CHECKOUT STAND WITH A BARCODE READER ON A BAGGING END

(75) Inventor: Steven J. Hammer, Lilburn, GA (US)

(73) Assignee: NCR Corporation, Duluth, GA (US)

(*) Notice: Subject to any disclaimer, the term of this patent is extended or adjusted under 35 U.S.C. 154(b) by 212 days.

(21) Appl. No.: 13/482,736

(22) Filed: May 29, 2012

(65) Prior Publication Data
US 2013/0320083 A1 Dec. 5, 2013

(51) Int. Cl.
| | |
|---|---|
| G06K 15/00 | (2006.01) |
| A63F 9/02 | (2006.01) |
| A47F 9/04 | (2006.01) |
| G07G 1/00 | (2006.01) |
| G06K 7/10 | (2006.01) |

(52) U.S. Cl.
CPC .............. A47F 9/046 (2013.01); G07G 1/0045 (2013.01); G06K 7/1096 (2013.01)
USPC .......... 235/383; 235/462.14; 186/61; 186/66; 186/68

(58) Field of Classification Search
CPC . G07G 1/0036; G07G 1/0045; G07G 1/0054; A47F 9/04; A47F 9/042; A47F 9/043; A47F 9/045; A47F 9/046; A47F 9/047; G06K 7/10861; G06K 7/1096
USPC ............ 235/383, 462.13, 462.14; 186/59–69; 177/238–245, 180–182, 126; 198/367
See application file for complete search history.

(56) References Cited

U.S. PATENT DOCUMENTS

| | | | |
|---|---|---|---|
| 4,386,679 A * | 6/1983 | Mary .............................. | 186/68 |
| 5,495,097 A * | 2/1996 | Katz et al. ................ | 235/462.12 |
| 5,497,853 A | 3/1996 | Collins, Jr. | |
| 5,978,772 A * | 11/1999 | Mold .............................. | 705/16 |
| 6,330,973 B1 * | 12/2001 | Bridgelall et al. ....... | 235/462.45 |
| 6,554,189 B1 * | 4/2003 | Good et al. .............. | 235/462.01 |
| 7,204,346 B2 * | 4/2007 | Kurtz et al. ..................... | 186/59 |
| 2003/0222092 A1 * | 12/2003 | Sherrod ......................... | 221/92 |
| 2004/0195334 A1 * | 10/2004 | Silverbrook et al. .... | 235/462.14 |
| 2005/0029052 A1 * | 2/2005 | Nguyen .......................... | 186/66 |
| 2009/0134221 A1 * | 5/2009 | Zhu et al. ..................... | 235/383 |
| 2012/0187191 A1 * | 7/2012 | Olmstead ................. | 235/462.13 |

FOREIGN PATENT DOCUMENTS

| | | | |
|---|---|---|---|
| GB | 2249072 A | * | 4/1992 |
| JP | 03263295 A | * | 11/1991 |

OTHER PUBLICATIONS

English-equivalent translation of JP 03-263295, Date of patent: Nov. 22, 1991.*

* cited by examiner

Primary Examiner — Michael G Lee
Assistant Examiner — Suezu Ellis
(74) Attorney, Agent, or Firm — Paul W. Martin

(57) ABSTRACT

A checkout stand with a barcode reader on a bagging end which reduces transaction times over conventional checkout stand designs. An example checkout stand includes a housing including a first and a second end, a conveyor for transporting items from the first end to the second end, a bagging station at the second end, a base portion between the conveyor and the bagging station, a first tower portion on the base portion, and a second tower portion on the base station separated from the first tower portion by a gap. The base portion and the first and second tower portions are for mounting a barcode reader for scanning the items before the items reach the bagging station.

4 Claims, 5 Drawing Sheets

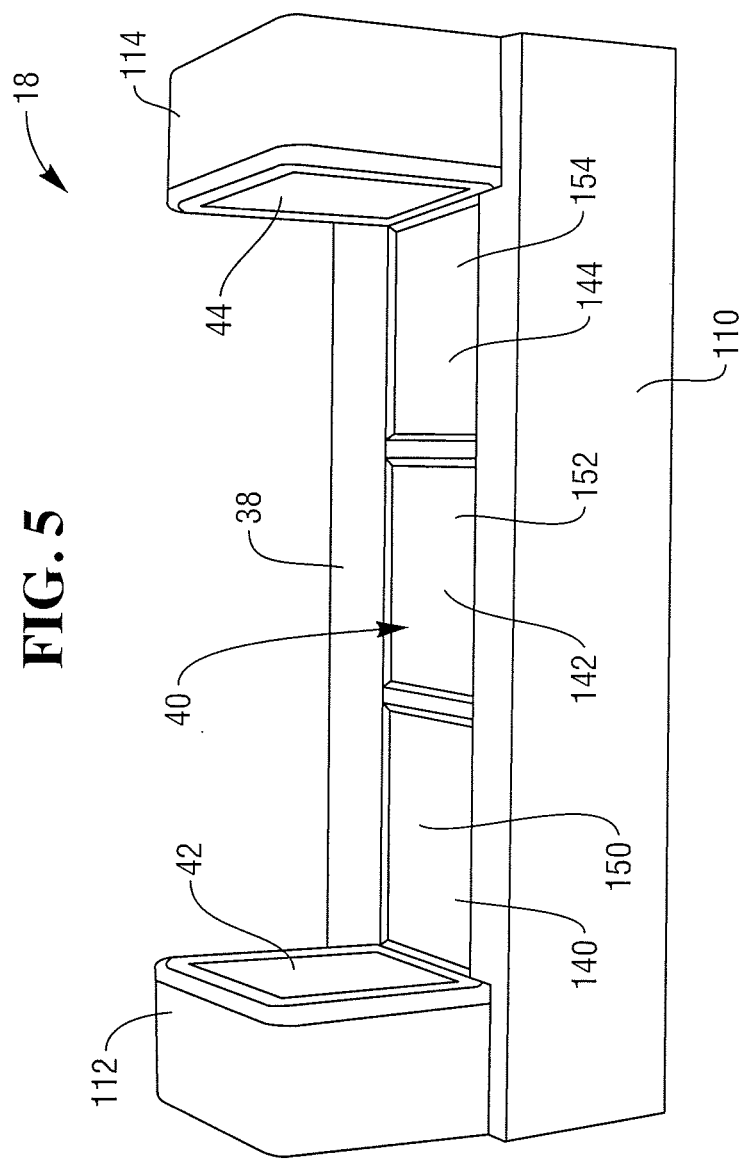

CHECKOUT STAND WITH A BARCODE READER ON A BAGGING END

BACKGROUND

This present invention relates to checkout systems and methods and more specifically to a checkout stand with a barcode reader on a bagging end.

Retailers wish to reduce transaction time and expedite the customer checkout process. Conventional checkout stands typically include a multi-aperture barcode reader and conveyors on one or both sides of the barcode reader, or a conveyor on one side and a bagging station on the other side. An operator faces the barcode reader in a direction perpendicular to the flow of items and must move the items across the barcode reader using a side to side arm motion across the body.

It would be desirable to provide an alternative checkout stand design to further expedite the checkout process.

SUMMARY

In accordance with the teachings of the present invention, a checkout stand with a barcode reader on a bagging end and associated checkout method is provided.

An example checkout stand includes a housing including a first and a second end, a conveyor for transporting items from the first end to the second end, a bagging station at the second end, a base portion between the conveyor and the bagging station, a first tower portion on the base portion, and a second tower portion on the base station separated from the first tower portion by a gap. The base portion and the first and second tower portions are for mounting a barcode reader for scanning the items before the items reach the bagging station.

An example bar code reader adapted for use at an end of a checkout stand for scanning a plurality of the items moving in parallel in a direction towards a bagging station of the checkout stand is generally U-shaped and includes a first portion having a generally horizontal aperture, a second portion having a generally vertical aperture, and a third portion having a generally vertical aperture facing the generally vertical aperture of the second portion and separated from the generally vertical aperture of the second portion by a gap. The gap is wide enough for an operator facing the gap to pass a plurality of items in parallel through the gap towards the bagging station.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

FIG. 5 is a perspective view of an example barcode reader.

DETAILED DESCRIPTION

Figure 1:
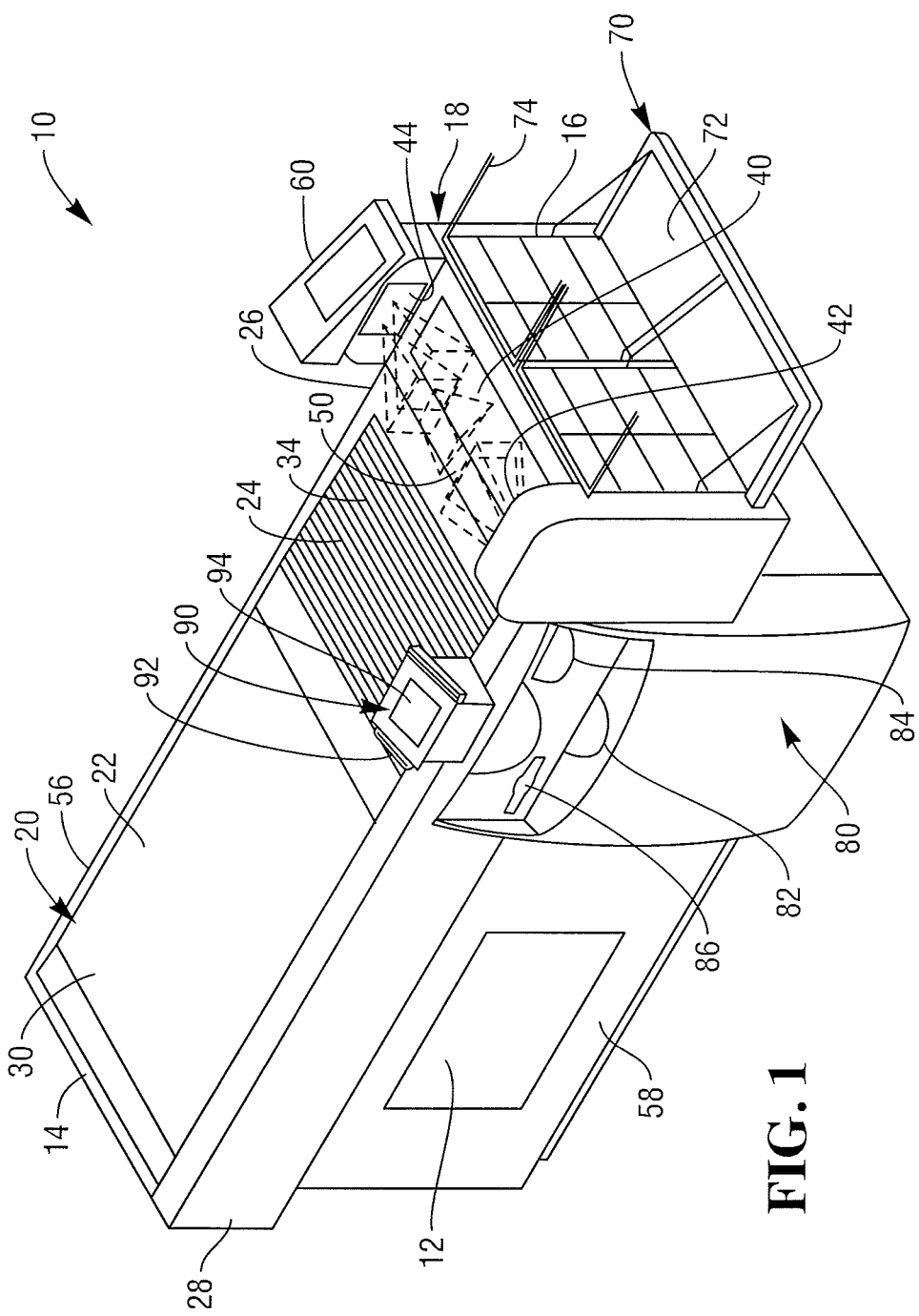
FIG. 1 is a perspective view of an example checkout stand.
Figure 2:
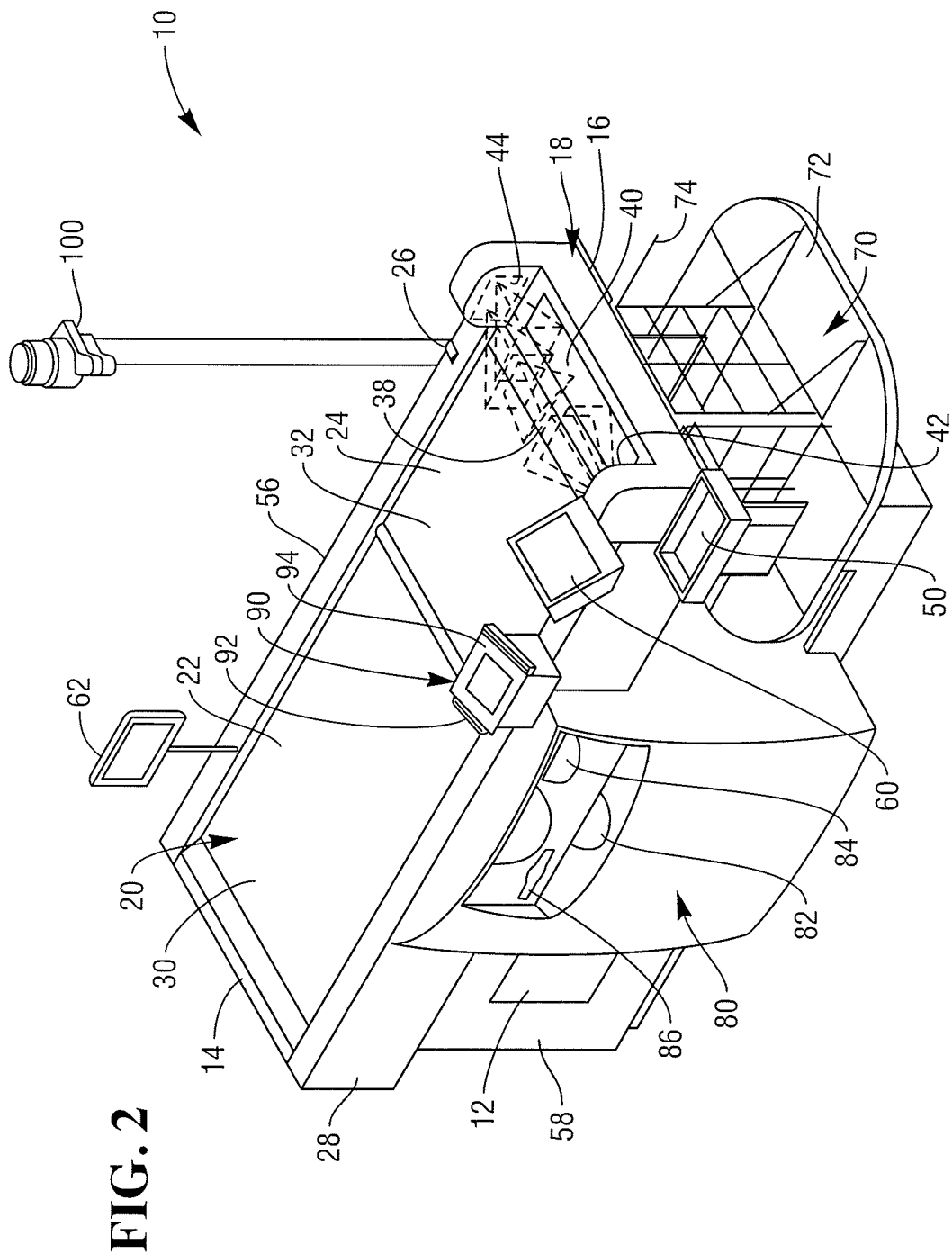
FIG. 2 is a perspective view of another example checkout stand.
Figure 3:
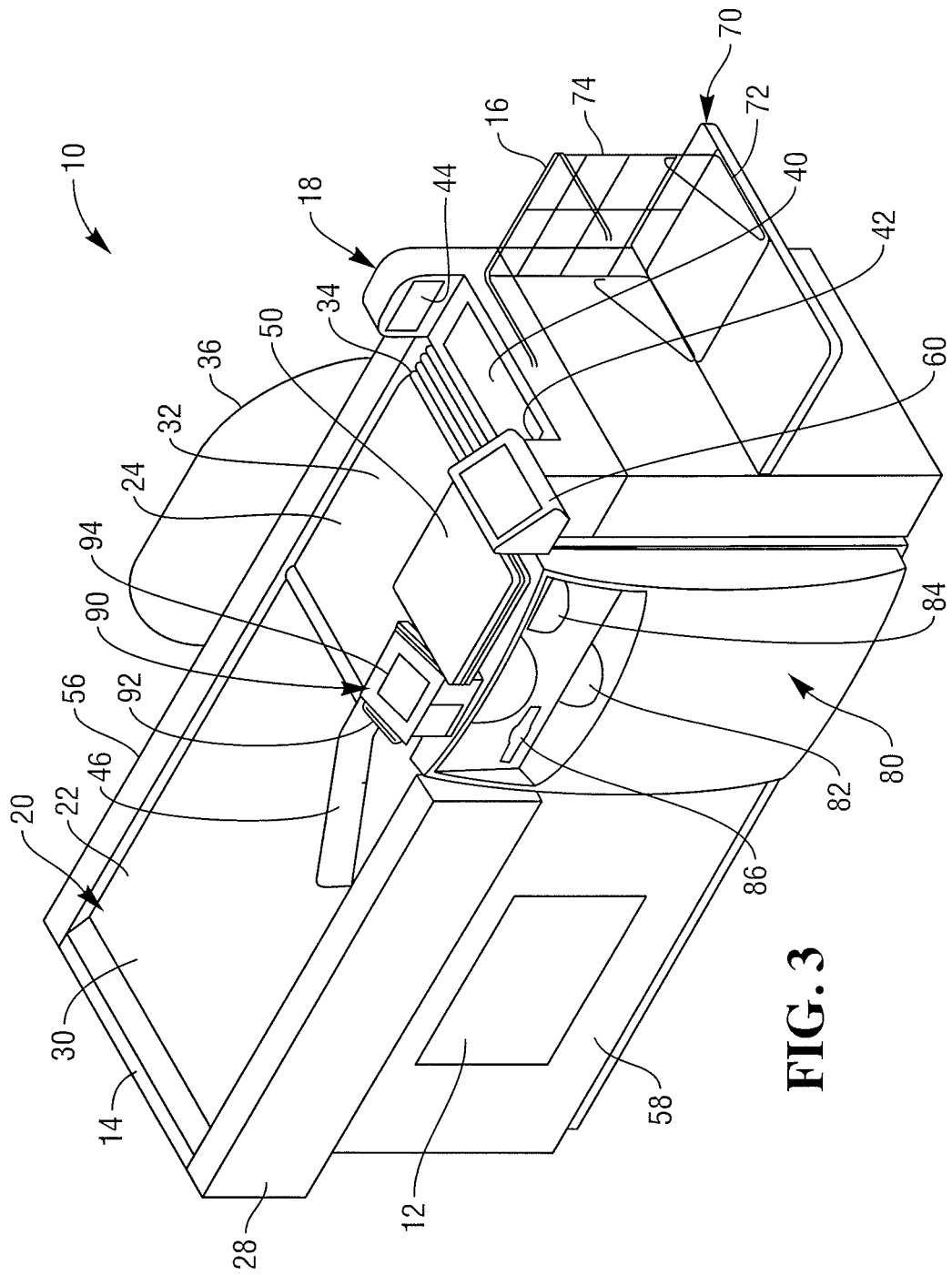
FIG. 3 is a perspective view of another example checkout stand.

With reference to FIGS. 1-3, example embodiments of a checkout stand 10 are illustrated. Checkout stand 10 includes a computer 12 for controlling operation of checkout stand 10 and its components. For this purpose, computer 12 executes transaction processing software. Computer 12 is located within checkout stand housing 28.

Computer 12 includes one or more processors, memory, and program and data storage. Computer 12 may execute an operating system such as a Microsoft or other operating system. Computer 12 may execute other computer software that may be stored in a computer readable medium, such as a memory. Computer 12 may be coupled to other computers, including an in-store server, via a network.

Checkout stand 10 includes a conveyer 20 which transports items from a first end 14 of checkout stand housing 28 to a second end 16 of housing 28. Conveyer 20 may include one or more sections. For example, conveyor 20 may include two sections 22 and 24 which are separately controllable. Conveyor section 22 may transport items to conveyor section 24 at one speed and conveyor section 24 may transport items to end 16 at another speed. A sensor 26 may sense items as they approach end 16 and send a signal to computer 12 so that the computer 12 may slow or stop conveyor portion 24. Alternatively, computer 12 may start conveyor section 24 after an item is scanned by barcode reader 18.

In one example embodiment, conveyor section 22 includes a belt and one or motors for moving the belt, and conveyor section 24 includes rollers 34, each one mounted slightly lower than the preceding one, so as to form a downwardly sloped conveying surface from conveyor section 22 to end 16. Payment machine sits below conveyor section 24 (FIG. 1).

In another example embodiment, conveyor sections 22 and 24 include belts 30 and 32 and one or more motors for moving belts 30 and 32. A transition strip 38 may be located between belt 32 and barcode reader 18 where belt 32 goes into checkout stand housing 28. Payment machine protrudes from one side of checkout stand housing 28 to provide room for conveyor section 24 (FIG. 2).

In another example embodiment, conveyor section 24 may include a combination of a belt 32 and rollers 34. In this configuration, conveyor section 24 is illustrated as being narrower than conveyor section 22 to allow payment machine 80 to be substantially flush with the side of checkout stand housing 28. A diverter 46 channels items from conveyor section 22 to conveyor section 24. A guard 36 on side 56 of checkout stand housing 28 minimizes the possibility of an item falling from conveyor section 24 (FIG. 3).

Barcode reader 18 is located at second end 16 of checkout stand housing 28. Barcode reader 18 may include any type of barcode reader. For example, barcode reader 18 may include an optical barcode reader which includes one or more lasers, mirrored spinners, collectors, detectors, and a plurality of pattern mirrors for directing laser light to create a scan pattern of laser beams for illuminating a barcode. As another example, barcode reader 18 may include an imaging device, such as a camera, for capturing an image including a barcode. In another example, barcode reader 18 may include a combination of an optical barcode reader and an imaging device.

Barcode reader 18 may read a barcode from one or more directions. For example, barcode reader 18 may include a substantially horizontal aperture that may also be substantially flush with section 24 of conveyor 12. From this aperture, barcode reader 18 may read a barcode on a bottom surface of an item, and possibly other sides of the item, except for a top side.

As another example, barcode reader 18 may include a substantially vertical aperture. From this aperture, barcode reader 18 may read a barcode on a side of an item facing this surface, and possibly other sides of the item, except for side opposite the aperture.

Other aperture orientations and reading directions are also envisioned, as well as combinations of aperture orientations and reading directions. For example, barcode reader 18 may include a combination of substantially horizontal and vertical apertures to enhance a probability of reading a barcode on an item. In the example configuration of FIG. 1, barcode reader 18 includes a substantially horizontal reading aperture 40 and opposing substantially vertical reading apertures 42 and 44.

In one example embodiment, barcode reader 18 may include an integral scale with weigh plate 50 for weighing produce items (FIG. 1). For this purpose, and example scale 50 includes load cells on the underside of each corner of the weigh plate as illustrated in commonly assigned U.S. Pat. No. 8,113,431, which is hereby incorporated by reference. Weigh plate 50 may include a substantially horizontal aperture that may also be substantially flush with section 24 of conveyor 12. In other embodiments, scale 50 may be separately mounted to checkout stand housing 28 (FIGS. 2 and 3).

An operator display and input device, combined as a touch screen 60, are also located at end 16 of checkout stand housing 28. Operator touch screen 60 displays transaction screens from the computer 12 and records operator selections during the transaction. Checkout stand 10 includes a customer display 62 when checkout stand 10 is configured for assisted service operation.

A bagging station 70 is also located at end 16 of checkout stand housing 28 where items are placed by an operator following reading of barcodes on the items. Bagging station 70 may include a shelf 72 and bag racks 74. Shelf 72 and bag racks 74 are constructed to minimize the possibility of operator injury during scanning and bagging of items. For example, shelf 72 and bag racks 74 may include rounded edges and/or padding.

Payment machine 80 is located on a customer side 58 of checkout stand housing 28. Payment machine 80 may include a cash drawer or combinations of currency and coin acceptors and dispensers. In one example embodiment, payment machine 80 includes a currency recycler 82 and a coin dispenser 84 for both assisted and self-service operation. Payment machine 80 may also contain printer 86 for printing receipts and other integrated payment peripherals, such as a card reader.

One or more payment peripherals 90 may alternatively or in addition be separately mounted to checkout stand housing 28 adjacent payment machine 80. In one example embodiment, payment peripheral 90 includes a card reader 92 and a signature pad 94.

Checkout stand 10 may further include a light post 100 for signaling customers that checkout stand 10 is available for assisted service operation and/or for signaling an attendant or store employee of different transaction conditions that require assistance, particularly during self-checkout operation.

During an example assisted service mode of operation, customers approach customer side 58 of checkout stand housing 28 and place items from shopping carts on conveyer 20 near end 14. Customers then reposition themselves to payment machine 80 and their shopping carts beyond payment machine 80, adjacent bagging station 70. An operator located at end 16 initiates a transaction using touch screen 60. Computer 12 activates conveyer 20. Conveyer 20 transports the items to end 16 where the operator may use both hands to grasps items, move the items past barcode reader 18, and place them in bags in the bagging station 70. Computer 12 may start conveyor 20 when computer 12 receives an indication from barcode reader 18 that a barcode has been successfully read by barcode reader 18. After the last item is scanned and placed in a bag, the operator makes a selection for the customer to complete payment. The customer uses payment machine 80 to pay and obtain a receipt. While the customer is completing payment, the operator may place the bags in the customer's shopping cart. The operator waits for the next customer.

During an example self-service mode of operation, customers approach customer side 58 of checkout stand housing 28 and place items from shopping carts on conveyer 20 near end 14. Customers then reposition then reposition their shopping carts adjacent bagging station 70 and move to end 16 where they can initiate a transaction using touch screen 60. Computer 12 activates conveyer 20. Conveyer 20 transports the items to end 16 where the customer may use both hands to grasps items, move the items past barcode reader 18, and place them in bags in the bagging station 70. Computer 12 may start conveyor 12 when computer 12 receives an indication from barcode reader 18 that a barcode has been successfully read by barcode reader 18. After the last item is scanned and placed in a bag, the customer may place the bags in the customer's shopping cart. The customer then makes a selection to complete payment and then moves to payment machine 80 to pay and obtain a receipt. Transaction processing software waits for the next customer.

Figure 4:
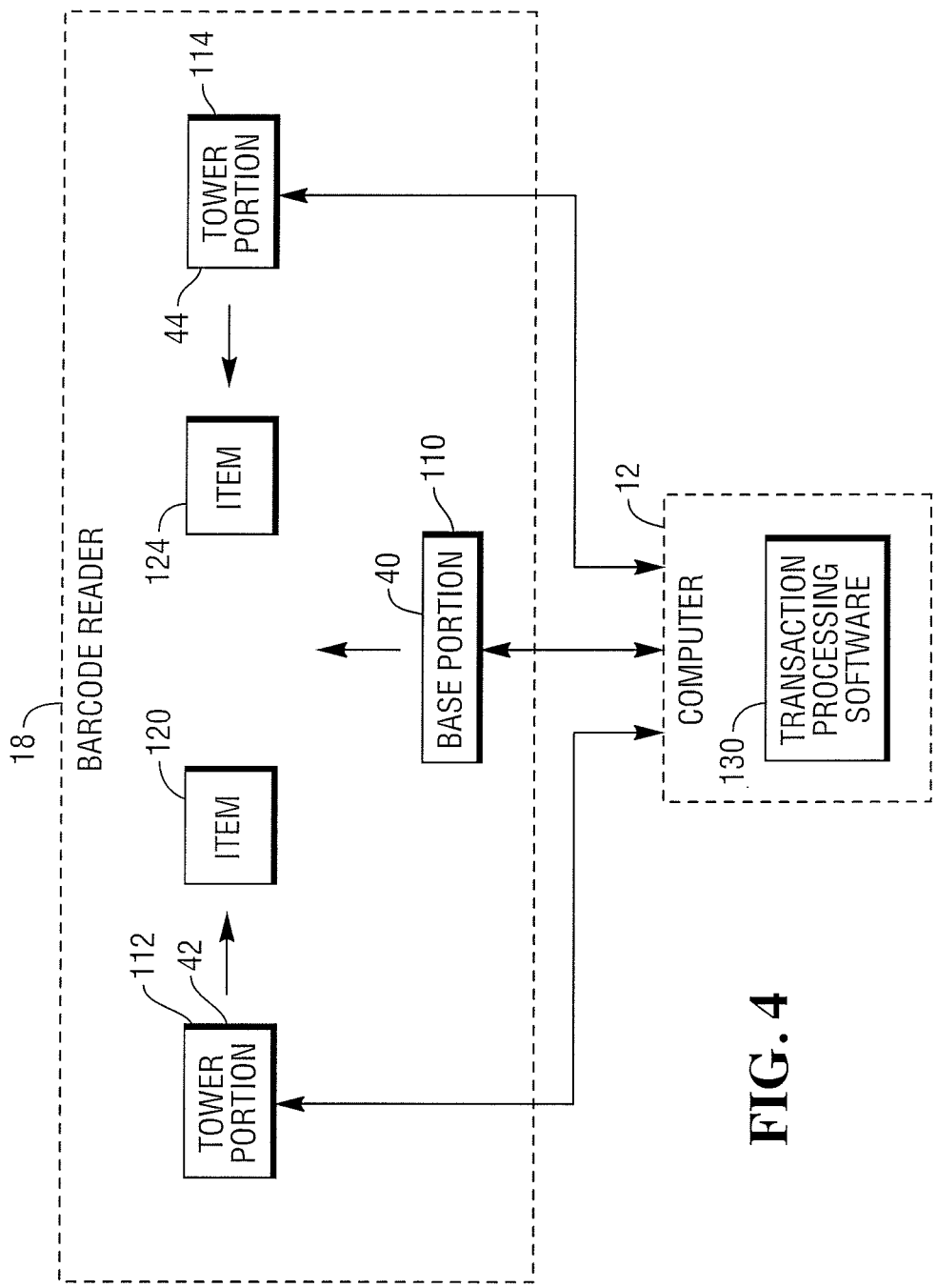
FIG. 4 is a block diagram of a barcode reader.

With reference to FIG. 4, an example barcode reader 18 is mounted to a base portion 110 and opposite tower portions 112 and 114 coupled to housing 28. Base portion 110 is generally rectangular in shape and includes a generally rectangular surface generally flush with conveyor 12 and the aperture 40 of barcode reader 18. Transition strip 38 covers the surface of base portion 110 and conveyor 12 where they meet. When barcode reader 18 is equipped with a scale 50, a scale weigh plate sits on base portion and may be generally flush with conveyor 12.

Tower portion 112 is mounted on one end of base portion 110 and includes a surface generally flush with aperture 42 of barcode reader 18. Tower portion 114 is mounted on the other end of base portion and includes a surface generally flush with aperture 44. Barcode reader apertures 42 and 44 and associated tower portion surfaces are generally perpendicular to aperture 40 and its associated base portion surface. Apertures 42 and 44 of barcode reader 18 face each other. Barcode reader 18 is generally U-shaped and may be capable of reading a barcode from a plurality of different directions relative to respective apertures 40-44. Other configurations are envisioned. For example, apertures 42 and 44 may be inclined at the same of different angles.

With reference to FIG. 5, barcode reader 18 may be modular in nature, with one or more portions functioning independently of the other. Alternatively, barcode reader 18 may include a single integrated barcode reader connected to computer 12, within base portion 110 and tower portions 112 and 114.

In the illustrated example, each of base portion 110 and tower portions 112 and 114 include individual barcode reader modules which function independently of the other to read barcodes, but all provide any barcode information they capture to computer 12. Transaction processing software 130 receives barcode information from one or more of the barcode reader modules within base portion 110 and tower portions 112 and 114 during scanning and decides which barcode information to accept. For example, transaction processing software 130 implements procedures for determining when barcode reader modules within base portion 110 and one of side portions 112 or 114 has scanned a barcode from the same item.

In one example configuration, any of portions 110-114 may contain more than one barcode reader module. For example, base portion 110 may itself include a plurality of independently functioning barcode reader modules 140, 142, and 144, each separately coupled to computer 12 and each capable of reading a barcode from a plurality of directions relative to their respective aperture portions 150, 152, and 154 within aperture 40 (FIG. 5). An example configuration includes a base portion 110 in the checkout counter containing three NCR model 7884 barcode readers for bottom, leading, and trailing side scanning, and tower portions 112 and 114 coupled to the base portion, each containing one NCR model 7884 barcode readers for top, leading, and trailing side scanning.

Advantageously, the configuration of checkout stand 10 facilitates use of both hands for scanning items in the direction of item flow, with one hand moving parallel to the other, away from and towards the body, as opposed to side to side across the body. This parallel scanning motion overcomes the limitations of side to side scanning.

The length of the gap between tower portion 112 and tower portion 114 is wide enough for as many as two items 120 and 124 to be passed, one for each operator hand, and is comparatively wider than a conventional dual-aperture barcode reader in a side scanning configuration. In an example checkout stand configuration, the distance between tower portions 112 and 114 is about eighteen inches.

Barcode reader 18 is capable of reading barcodes on both items moving in parallel through the gap at the same time, if an operator chooses to do so. Alternatively, an operator may employ an alternating scanning style which involves scanning and bagging one item while picking up another item to be scanned, still moving the items along parallel tracks towards bagging station 70.

Further, the configuration of checkout stand 10 facilitates a single scan and bag motion, versus separate scan and bag motions. Also, the scanning motion allows items to be placed into bags without the operator having to turn or bend sideways.

From a position at end 16, the operator may easily see the bottom of the adjacent shopping cart, which may result in less shrinkage or theft.

In a timed experiment, the time to scan, bag, and load a shopping cart using checkout stand 10 was approximately half the time required when using a conventional checkout stand configuration.

Although the present invention has been described with particular reference to certain preferred embodiments thereof, variations and modifications of the present invention can be effected within the spirit and scope of the following claims.

What is claimed is:

1. A checkout stand comprising:
a housing including a first and second end; and
a conveyor for transporting items along a path from the first end to an operator station at the second end, and wherein the conveyor comprises a first section for conveying the items from the first end and a second section for conveying the items to the operator station, and wherein the first and second sections comprise first and second conveyor belts, and the second conveyor belt is narrower than the first conveyor belt, and wherein the first section comprises the first conveyor belt and the second section comprises a plurality of rollers arranged in a generally downward slope from the first conveyor belt to the operator station;
wherein the operator station includes a barcode reader and bag racks, the barcode reading including a first tower portion on a first side of the transport path for scanning the items from a first direction across the path, a second tower portion on a second side of the transport path for scanning the items from a second direction across the path, the second tower portion being opposite the first tower portion and separated from the first tower portion by a gap coincident with the path;
wherein the conveyor transports the items to a position prior to the operator station to be passed through the gap by an operator.

2. The checkout stand of claim 1, wherein the barcode reader further comprises a base portion in the gap for scanning the items from a third direction, and wherein the base portion and the first and second tower portions form a generally U-shaped housing for the barcode reader.

3. The checkout stand of claim 1, wherein the gap is wide enough for the operator to pass two of the items in parallel through the gap towards the bag racks.

4. A checkout stand comprising:
a housing including a first and a second end;
a conveyor for transporting items from the first end to the second end;
a bagging station at the second end;
a base portion between the conveyor and the bagging station;
wherein the conveyor includes a first section including a conveyor belt for conveying the items from the first end and a second section including a plurality of rollers arranged in a generally downward slope from the first conveyor to the base portion for conveying the items to the base portion;
a first tower portion on the base portion; and
a second tower portion on the base portion separated from the first tower portion by a gap; and
wherein the base portion and the first and second tower portions are for mounting a barcode reader for scanning the items before the items reach the bagging station.

\* \* \* \* \*